(12) United States Patent
Kim et al.

(10) Patent No.: US 8,456,449 B2
(45) Date of Patent: Jun. 4, 2013

(54) TOUCH SENSING APPARATUS AND METHOD OF DRIVING THE SAME

(75) Inventors: Joo-Young Kim, Suwon-si (KR); Cheolwoo Park, Suwon-si (KR); JongHee Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 455 days.

(21) Appl. No.: 12/825,820

(22) Filed: Jun. 29, 2010

(65) Prior Publication Data

US 2011/0115726 A1 May 19, 2011

(30) Foreign Application Priority Data

Nov. 13, 2009 (KR) .................. 10-2009-0109718

(51) Int. Cl.
 *G06F 3/042* (2006.01)
(52) U.S. Cl.
 USPC .................. 345/175; 345/173; 178/18.01
(58) Field of Classification Search
 USPC .................. 345/173, 175; 178/18.01
 See application file for complete search history.

(56) References Cited

U.S. PATENT DOCUMENTS

| 6,429,857 | B1 | 8/2002 | Masters et al. | |
|---|---|---|---|---|
| 7,098,592 | B2 * | 8/2006 | Nishikawa | 313/506 |
| 2002/0033805 | A1 * | 3/2002 | Fujioka et al. | 345/175 |
| 2002/0175900 | A1 * | 11/2002 | Armstrong | 345/173 |
| 2004/0140961 | A1 * | 7/2004 | Cok | 345/175 |
| 2006/0132454 | A1 * | 6/2006 | Chen et al. | 345/173 |

FOREIGN PATENT DOCUMENTS

| JP | 2008059123 | 3/2008 |
|---|---|---|
| KR | 1020080096975 | 11/2008 |

* cited by examiner

*Primary Examiner* — Latanya Bibbins
(74) *Attorney, Agent, or Firm* — Cantor Colburn LLP (57) ABSTRACT

A touch sensing apparatus includes; at least one light source which sequentially generates a plurality of lights, a light sensor which faces the at least one light source and outputs a plurality of signals corresponding to a magnitude of the plurality of lights, a light guide plate interposed between the at least one light source and the light sensor to guide the plurality of lights from the at least one light source to the light sensor and a coordinate generator which calculates coordinates of a touch input which occurs on the light guide plate using the signal output from the light sensor corresponding to the touch input.

13 Claims, 8 Drawing Sheets

TOUCH SENSING APPARATUS AND METHOD OF DRIVING THE SAME

This application claims priority to Korean Patent Application No. 2009-109718, filed on Nov. 13, 2009, and all the benefits accruing therefrom under 35 U.S.C. §119, the content of which in its entirety is herein incorporated by reference.

BACKGROUND OF THE INVENTION

1. Field of the Invention

The present invention relates to a touch sensing apparatus and a method of driving the same. More particularly, the present invention relates to a touch sensing apparatus and a method of driving the same, wherein the touch sensing apparatus is capable of reducing power consumption thereby in order to extend a life span thereof.

2. Description of the Related Art

A typical touch sensing apparatus detects externally provided tactile input, e.g., touches from a user. The typical touch sensing apparatus may be classified into a resistive type, a surface-acoustic wave ("SAW") type and a light sensing type according to the operating principles thereof.

The typical resistive type touch sensing apparatus detects a change in an electrical current corresponding to a touch input from a user. The typical SAW type touch sensing apparatus detects an ultrasonic wave changed corresponding to a touch input from a user. In addition, the typical light sensing type touch sensing apparatus includes a light emitting device and a light receiving device to detect the variation in the amount of light supplied to the light receiving device corresponding to a touch input from a user, thereby determining the position of the touch input.

The typical light sensing type touch sensing apparatus requires many light emitting and receiving devices. Accordingly, the sensing function of the light sensing type touch sensing apparatus is degraded if the light emitting and receiving devices have exceeded their operational life-span, e.g., if the light emitting and receiving devices have significantly degraded operational characteristics.

BRIEF SUMMARY OF THE INVENTION

Embodiments of the present invention provide a touch sensing apparatus capable of reducing power consumption to extend a life span thereof.

Embodiments of the present invention also provide a method of driving the touch sensing apparatus.

According to exemplary embodiments, the touch sensing apparatus includes; at least one light source which sequentially generates a plurality of lights, a light sensor which faces the at least one light source and outputs a plurality of signals corresponding to a magnitude of the plurality of lights, a light guide plate interposed between the at least one light source and the light sensor to guide the plurality of lights from the at least one light source to the light sensor, and a coordinate generator which calculates coordinates of a touch input which occurs on the light guide plate using the signal output from the light sensor corresponding to the touch input.

According to exemplary embodiments, the method of driving the touch sensing apparatus includes; receiving a sequentially generated series of lights, outputting a signal corresponding to a magnitude of each of the lights, receiving the signal, detecting whether a portion of the signal is reduced in magnitude corresponding to a touch input and calculating coordinates of the touch input using the portion of the signal having reduced magnitude.

According to the above, at least one light source can be sequentially driven to detect a touch, thereby increasing the life span of the at least one light source and reducing consumption of power to drive the light source.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

FIGS. 1A to 1D are top plan views showing a first exemplary embodiment of scanning operations to detect a touch input by a first exemplary embodiment of a touch sensing apparatus 100 according to the present invention.

Hereinafter, the structure of the exemplary embodiment of a touch sensing apparatus 100 will be described with reference to FIGS. 1A to 1D. The touch sensing apparatus 100 includes a light source, a light guide plate 40, a light sensor 60, a coordinate generator 70 and a frame 50.

According to the first exemplary embodiment of the present invention, at least one light source is provided. When a plurality of light sources are provided, N light sources of the plurality of light sources, wherein N is a natural number, may be packaged into one group, so that the N light sources can be classified into at least one group. For instance, if the plurality of light sources include 36 light sources the plurality of light sources may be packaged into 9 groups, wherein each group has 4 lights. In the present exemplary embodiment, the plurality of light sources include first to thirty-sixth light sources 1 to 36. When viewed from a plan view, the first to thirty-sixth light sources 1 to 36 are sequentially arranged along one edge of the light guide plate 40; as shown in FIGS. 1A-4, only the first light source in a group is numbered, e.g., light sources 1, 5, 9, 13, 17, 21, 25, 29 and 33. When viewed from a top plan view, lights that have been generated from the first to thirty-sixth light sources 1 to 36 and supplied to an inside of the light guide plate 40 travel with substantially the same exit angles $\Theta$.

In the first exemplary embodiment of the present invention, although 36 light sources are provided in total, the number of the light sources should not be limited thereto or thereby. That is, the number of the light sources may be increased or decreased according to a size of a touch region sensed by the touch sensing apparatus 100. In addition, in the first exemplary embodiment of the present invention, although the first to thirty-sixth light sources 1 to 36 generate an infrared light, the first to thirty-sixth light sources 1 to 36 may include various light sources such as an organic light emitting diodes to generate a variety of wavelength of lights.

In one exemplary embodiment, the first to thirty-sixth light sources 1 to 36 may be classified into first to ninth groups GP1 to GP9. In more detail, the first group GP1 includes the first to fourth light sources 1 to 4, the second group GP2 includes the fifth to eighth light sources 5 to 8, the third group GP3 includes ninth to the twelfth light sources 9 to 12, the fourth group GP4 includes the thirteenth to sixteenth light sources 13 to 16, the fifth group GP5 includes the seventeenth to twentieth light sources 17 to 20, the sixth group GP6 includes twenty-first to twenty-fourth 21 to 24, the seventh group GP7 includes twenty-fifth to twenty-eighth 25 to 28, the eighth group GP8 includes the twenty-ninth to thirty-second light sources 29 to 32 and the ninth group GP9 includes thirty-third to thirty-sixth light sources 33 to 36. In other words, each of the first to ninth groups GP1 to GP9 includes four light sources that are sequentially arranged. The first to ninth groups GP1 to GP9 are sequentially arranged along one edge of the light guide plate 40. Alternative exemplary embodiments include configurations wherein the plurality of light sources may be arranged in a different number of groupings, e.g., in 10 or more groups or in fewer than 9 groups. For example, in one alternative exemplary embodiment the thirty-six light sources may be arranged in four groups of nine light sources each.

The light guide plate 40 is formed in a plate, e.g., planar, shape and may include materials such as polymethyl-methacrylate, polycarbonate and other materials having similar characteristics. The light guide plate 40 is provided to be adjacent to the first to thirty-sixth light sources 1 to 36 to receive the lights from the first to thirty-sixth light sources 1 to 36, thereby guiding the lights to the light sensor 60.

Exemplary embodiments of the light guide plate 40 has a refractive index of about 1.3 to about 2.0, which is greater than that of air, and therefore lights which are generated from the first to thirty-sixth light sources 1 to 36 and supplied to the light guide plate 40 are transmitted inside the light guide plate 40 and supplied toward the light sensor 60. Light from the first to thirty-sixth light sources 1 to 36 may be totally internally reflected from the top and bottom portions of the light guide plate 40 as seen from a cross-sectional perspective, e.g., light may be reflected from an out of the page direction such that it is redirected towards the light sensor 60.

When viewed from a top plan view, the light sensor 60 faces the first to thirty-sixth light sources 1 to 36 while interposing the light guide plate 40 between the light sensor 60 and the first to thirty-sixth light sources 1 to 36. The light sensor 60 receives lights from the first to thirty-sixth light sources 1 to 36 through the light guide plate 40 to generate an output signal corresponding to a magnitude of the received lights.

According to the first exemplary embodiment of the present invention, the light sensor 60 includes a plurality of photodetectors, e.g., photodiodes, phototransistors or other similar devices, to convert optical energy to electrical energy. Alternative exemplary embodiments of the present invention may include configurations wherein the light sensor 60 may include a linear charge-coupled device ("CCD").

Meanwhile, if a touch input occurs on the surface of the light guide plate 40 from an outside, a light which is transmitted in the light guide plate 40 may be partially absorbed by the touch, or the touch may change the difference in a refractive index between the light guide plate 40 and a different medium adjacent to the light guide plate 40, e.g., air surrounding the light guide plate, in which such a difference may cause total reflection of a light, so that the light can be output from the light guide plate 40. Accordingly, if the touch occurs on the surface of the light guide plate 40, the magnitude of light supplied toward the light sensor 60 is reduced corresponding to the reduced amount of the totally-reflected lights. Therefore, the signal output from the light sensor 60 can be reduced.

The coordinate generator 70 receives the signal output from the light sensor 60 corresponding to the touch occurring on the surface of the light guide plate 40 to calculate coordinates corresponding to the touch using the output signal. A method of calculating an X-axis coordinate and a Y-axis coordinate by the coordinate generator 70 will be described with reference to FIGS. 2 and 3 later.

The frame 50 receives the light sensor 60 and the coordinate generator 70 therein. In addition, in the present embodiment the frame 50 covers the edge of the light guide plate 40. Accordingly, a remaining region of the light guide plate 40 excluding the edge may be defined as a region in which a touch can be detected on the light guide plate 40.

The touch sensing apparatus 100 detects a touch occurring on the surface of the light guide plate 40 through consecutively performed first to fourth scanning operations. Hereinafter, the first scanning operation among the first to fourth scanning operations will be described with reference to FIG. 1A.

Figure 1A:
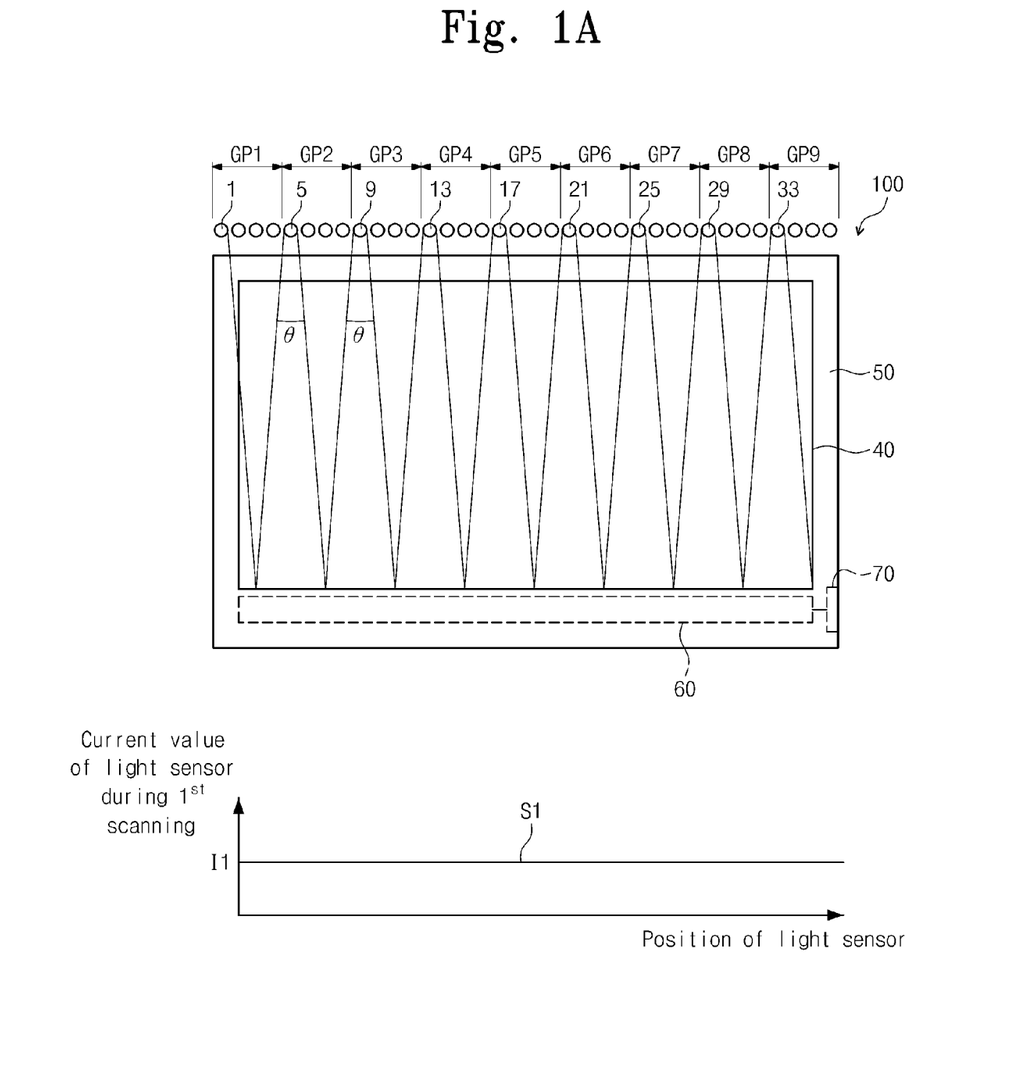
FIGS. 1A to 1D are top plan views showing a first exemplary embodiment of scanning operations to detect a touch input by a touch sensing apparatus according to the present invention.

Referring to FIG. 1A, in order to perform the first scanning operation, first light sources of each of the first to ninth groups GP1 to GP9 generate respective lights, e.g., light sources 1, 5, 9, 13, 17, 21, 25, 29 and 33, and the light sensor 60 receives the lights from the first light sources of the first to ninth groups GP1 to GP9 to output a signal corresponding to a magnitude of the lights received. In more detail, the first light source 1, the fifth light source 5, the ninth light source 9, the thirteenth light source 13, the seventeenth light source 17, the twenty-first light source 21, the twenty-fifth light source 25, the twenty-ninth light source 29, and the thirty-third light source 33 generate the respective lights, and the light sensor 60 outputs a signal having a current level corresponding to the magnitude of the lights supplied from the above light sources through the light guide plate 40.

According to the first exemplary embodiment of the present invention, as shown in FIG. 1A, the lights supplied to the light sensor 60 through the first scanning operation have continuous distribution, e.g., the lights from the first light sources of each group are angled to spread such that light from each light source is immediately adjacent to light from another light source on the edge of the light guide plate 40 corresponding to the light sensor 60. When viewed from a top plan view, the lights generated through the first scanning operation are not overlapped with each other in the light guide plate 40. In other words, in order to provide the continuous distribution of the lights supplied to the light sensor 60 through the first scanning operation while preventing the lights from being overlapped with each other in the light guide plate 40 when viewed from a top plan view, the arrangement intervals of the above light sources operating through to the first scanning operation and the exit angles Θ of the lights output from the above light sources may be adjusted.

Accordingly, a first output signal S1, which is output from the light sensor 60 through the first scanning operation, has a first current I1 which is substantially the same regardless of the position along the light sensor 60. However, different from a case shown in FIG. 1A, if a touch input occurs on the surface of the light guide plate 40, an output signal corresponding to the touch input may be generated, wherein a current level for the output signal corresponding to the touch input may be lower than the first current I1 at a position corresponding to the position of the touch input.

Figure 1B:
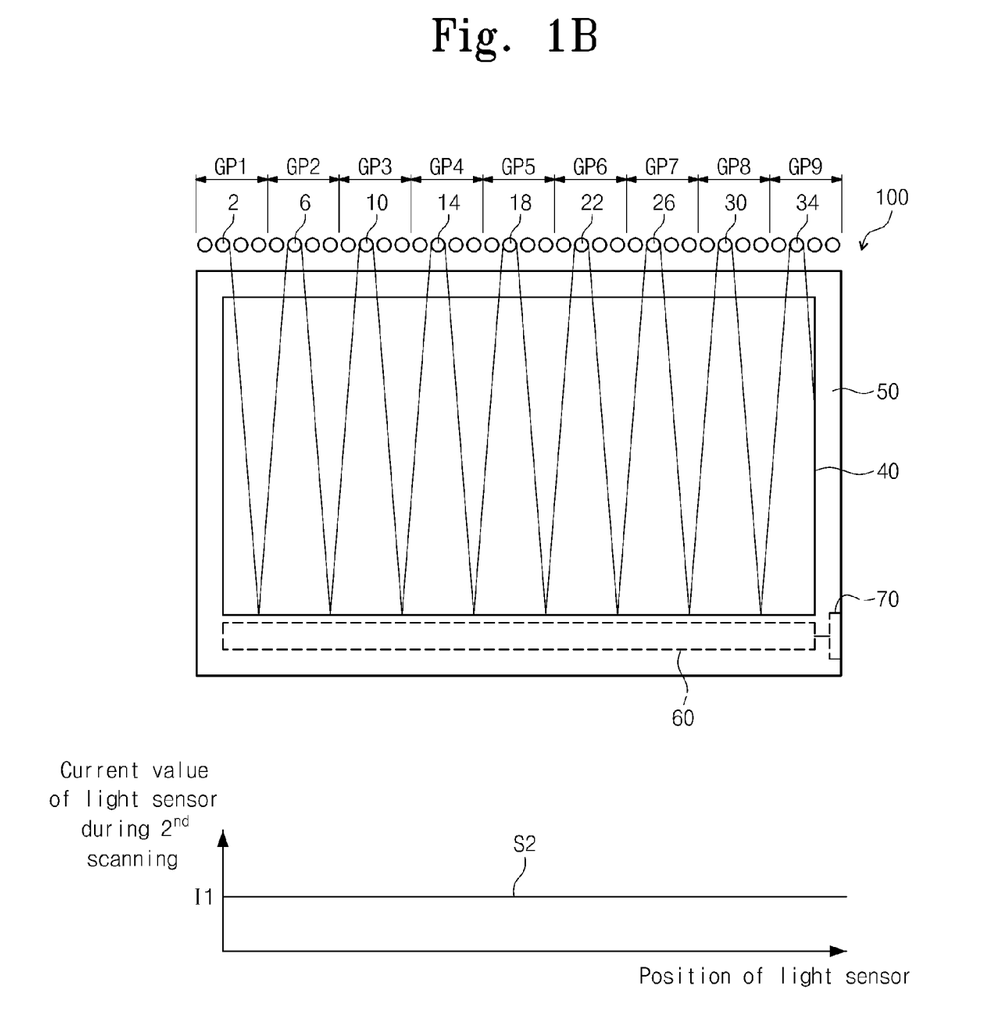

Hereinafter, a second scanning operation will be described with reference to FIG. 1B. In order to perform the second scanning operation, second light sources in the first to ninth groups GP1 to GP9 generate respective lights, and the light sensor 60 receives the lights from the second light sources of the first to ninth groups GP1 to GP9 to output a signal corresponding to a magnitude of the received lights. In more detail, through the second scanning operation, the second light source 2, the sixth light source 6, the tenth light source 10, the fourteenth light source 14, the eighteenth light source 18, the twenty-second light source 22, the twenty-sixth light source 26, the thirtieth light source 30 and the thirty-fourth light source 34 generate the lights, and the light sensor 60 outputs a signal having a current value corresponding to the magnitude of the lights supplied from the above light sources through the light guide plate 40.

In addition, similar to the first scanning operation, the lights supplied to the light sensor 60 through the second scanning operation have a continuous distribution. When viewed from a top plan view, the lights generated through the second scanning operation are not overlapped with each other in the light guide plate 40. Accordingly, a second output signal S2 output from the light sensor 60 through the second scanning operation may have the first current I1 output regardless of the position along the light sensor 60.

Figure 1C:
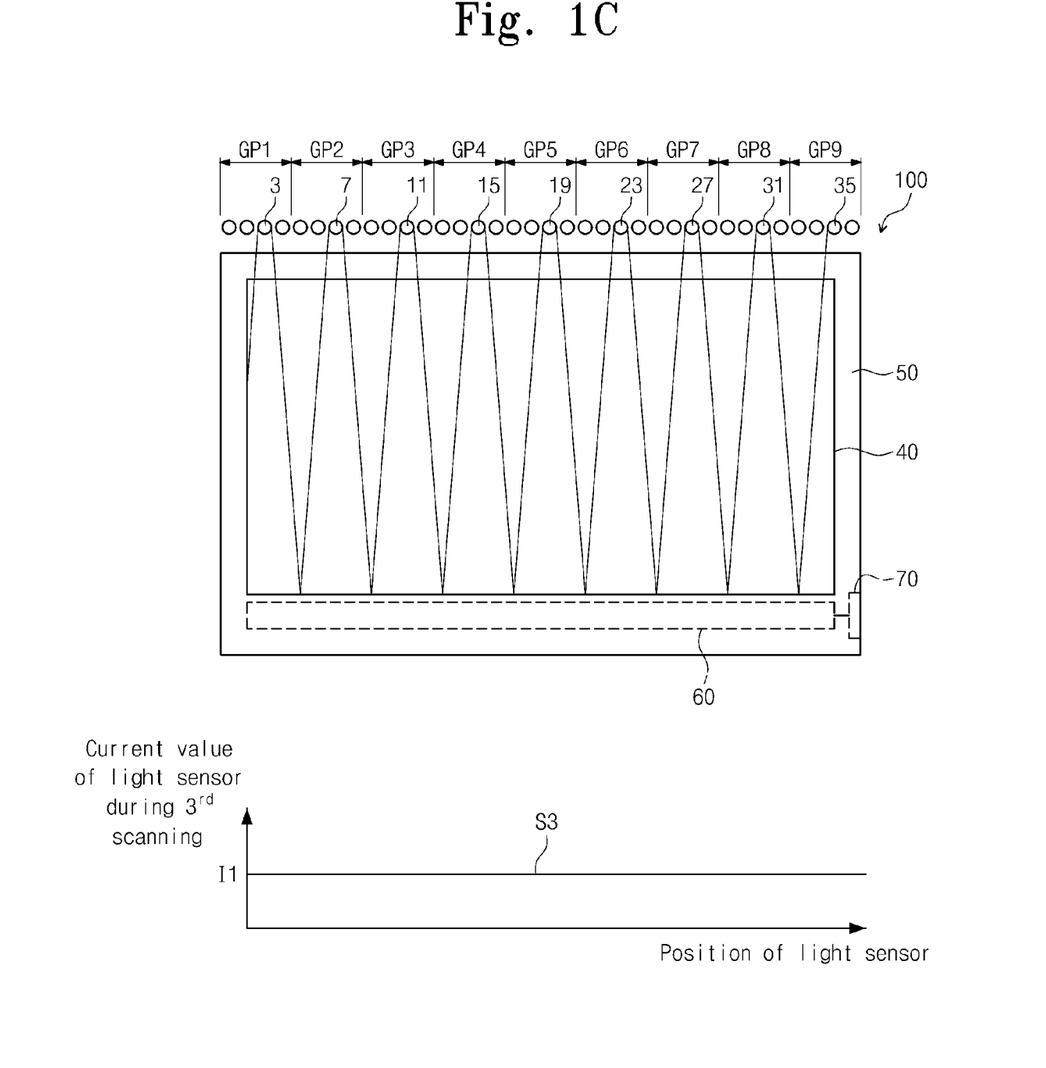

Hereinafter, a third scanning operation will be described with reference to FIG. 1C. In order to perform the third scanning operation, third light sources in the first to ninth groups GP1 to GP9 generate respective lights, and the light sensor 60 receives the lights from the third light sources of the first to ninth groups GP1 to GP9 to output a signal corresponding to a magnitude of the received lights. In more detail, through the third scanning operation, the third light source 3, the seventh light source 7, the eleventh light source 11, the fifteenth light source 15, the nineteenth light source 19, the twenty-third light source 23, the twenty-seventh light source 27, the thirty-first light source 31 and the thirty-fifth light source 35 generate the lights, and the light sensor 60 outputs a signal having a current value corresponding to the magnitude of the lights supplied from the above light sources through the light guide plate 40.

In addition, the lights supplied to the light sensor 60 through the third scanning operation have a continuous distribution, similar to the first and second scanning operations. When viewed from a top plan view, the lights generated through the third scanning operation are not overlapped with each other in the light guide plate 40. Accordingly, a third output signal S3 output from the light sensor 60 through the third scanning operation may have the first current I1 output regardless of the position along the light sensor 60.

Figure 1D:
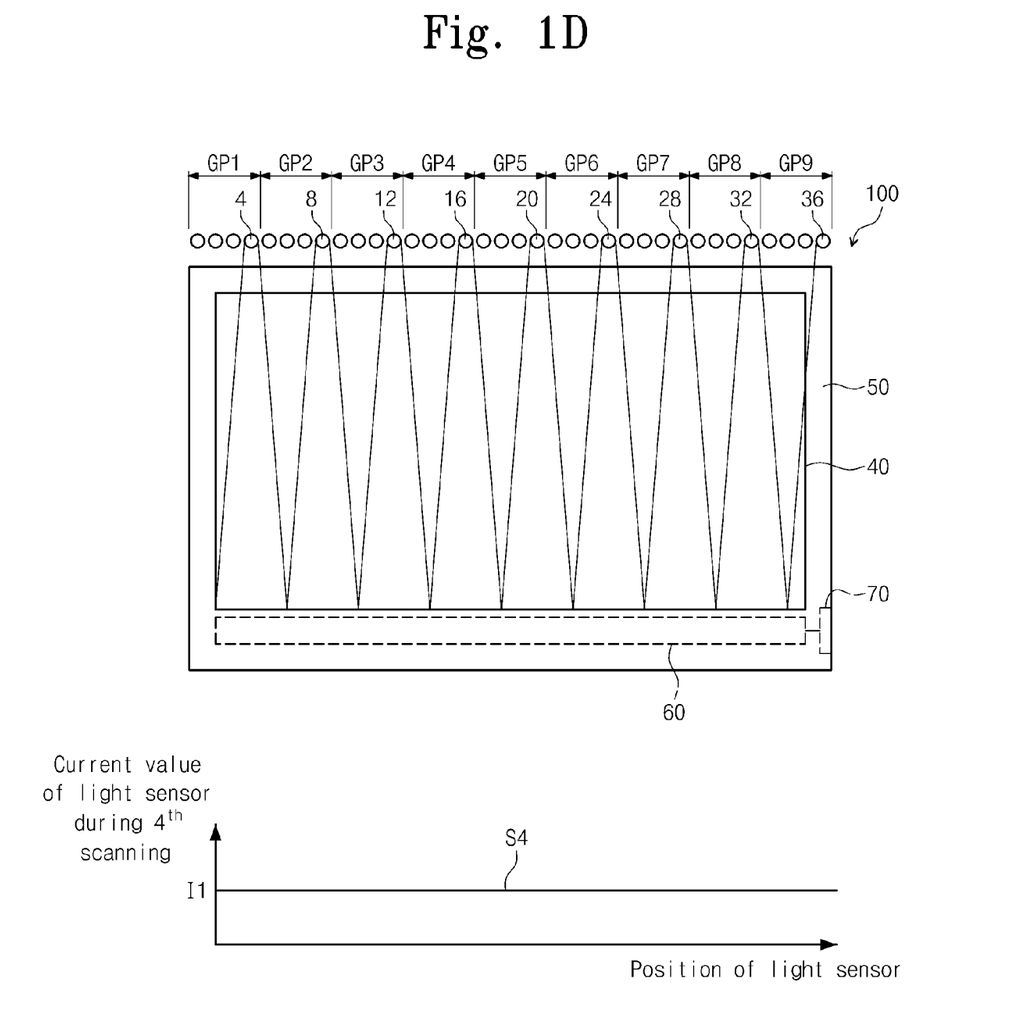

Hereinafter, a fourth scanning operation will be described with reference to FIG. 1D. In order to perform the fourth scanning operation, fourth light sources in the first to ninth groups GP1 to GP9 generate respective lights, and the light sensor 60 receives the lights from the fourth light sources of the first to ninth groups GP1 to GP9 to output a signal corresponding to a magnitude of the lights. In more detail, through the fourth scanning operation, the fourth light source 4, the eighth light source 8, the twelfth light source 12, the sixteenth light source 16, the twentieth light source 20, the twenty-fourth light source 24, the twenty-eighth light source 28, the thirty-second light source 32 and the thirty-sixth light source 36 generate the lights, and the light sensor 60 outputs a signal having a current value corresponding to the magnitude of the lights supplied from the above light sources through the light guide plate 40.

In addition, the lights supplied to the light sensor 60 through the fourth scanning operation have a continuous distribution, similar to that described above with respect to the first, second and third scanning operation. When viewed from a top plan view, the lights generated through the fourth scanning operation are not overlapped with each other in the light guide plate 40. Accordingly, a fourth output signal S4 output from the light sensor 60 through the fourth scanning operation may have the first current I1 output regardless of the position along the light sensor 60.

As described above with reference to FIGS. 1A to 1D, the first exemplary embodiment of a touch sensing apparatus 100 according to the present invention detects a touch occurring on the surface of the light guide plate 40 through the first to fourth scanning operations. Accordingly, during the first to fourth scanning operations, the first to thirty-sixth light sources 1 to 36 are not continuously driven during all scanning operations, but instead only one light from each group is driven during an individual scanning operation. Therefore, the life span of the first to thirty-sixth light sources 1 to 36 can be increased. Specifically, the life span of the first to thirty-sixth light sources 1 to 36 can be increased over a comparative apparatus wherein all light sources are continuously operated by a factor of the number of light sources in each group, e.g., the first exemplary embodiment has a life span increased by a factor of four. In addition, power consumption necessary to drive the first to thirty-sixth light sources 1 to 36 can be reduced. Specifically, the energy consumption of the first to thirty-sixth light sources 1 to 36 can be decreased over a comparative apparatus wherein all light sources are continuously operated by a factor of the number of light sources in each group, e.g., the first exemplary embodiment has an energy consumption one-fourth that of the comparative continuously operated apparatus.

Figure 2:
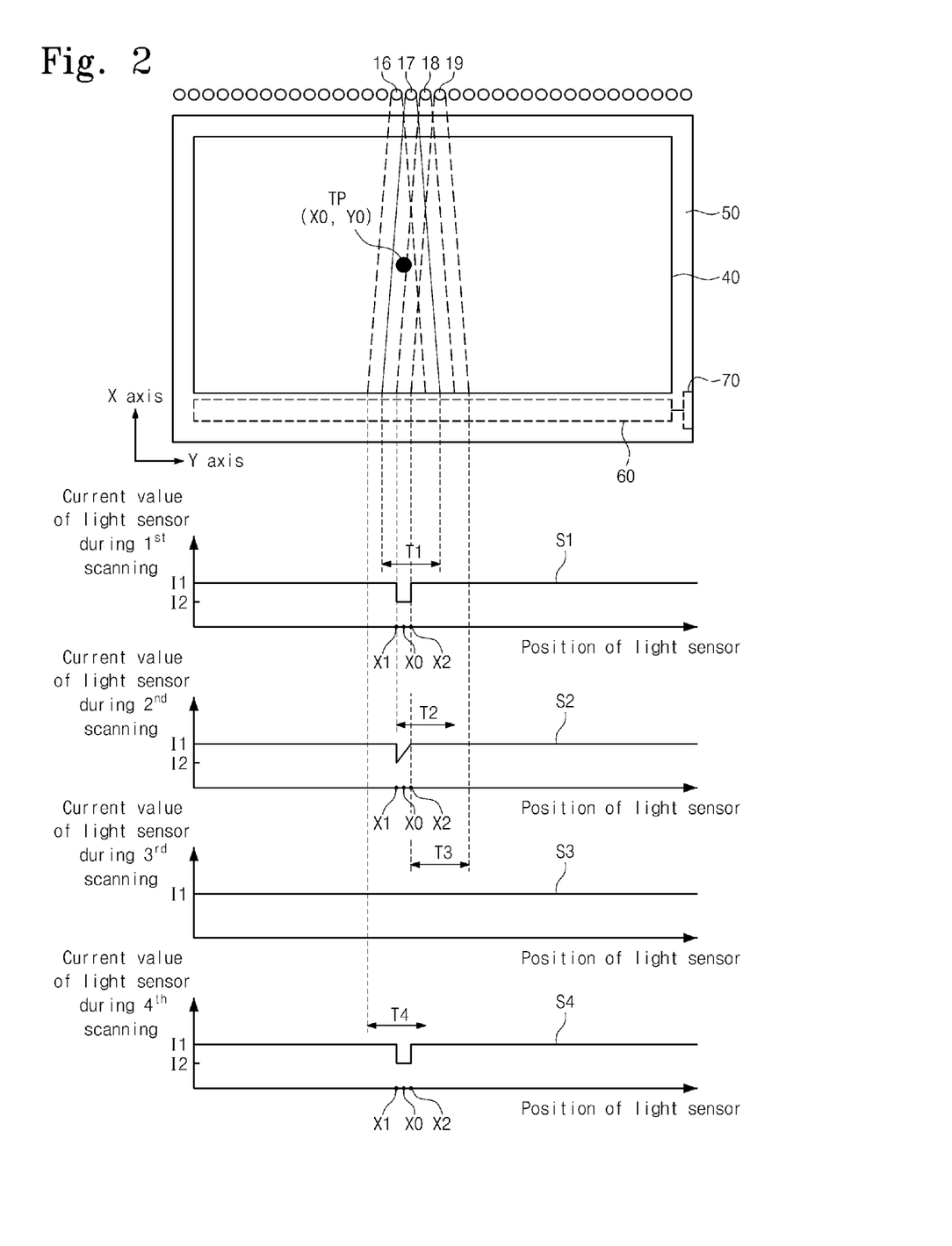
FIG. 2 is a top plan view showing a first exemplary embodiment of a method of calculating an X-axis coordinate of a touch location by the first exemplary embodiment of a touch sensing apparatus according to the present invention.

FIG. 2 is a top plan view showing an exemplary embodiment of a method of calculating an X-axis coordinate of a touch point using the exemplary embodiment of a touch sensing apparatus 100 according to the present invention.

Referring to FIG. 2, if a touch input TP occurs on the surface of the light guide plate 40 while performing the first to fourth scanning operations described with reference to FIGS. 1A to 1D, a reduction in current corresponding to a range of positions on the light sensor may occur in a portion of a signal output from the light sensor 60 during the first to fourth scanning operations.

In more detail, the distribution range of the light generated from the seventeenth light source 17, which is activated to generate light during the first scanning operation, is overlapped with the position of the touch input TP when viewed from a top plan view. Accordingly, in the first output signal 51 output from the light sensor 60 through the first scanning operation, a second current I2 having a magnitude lower than the first current I1 is output between a first X-axis coordinate X1 and a second X-axis coordinate X2, wherein the second current I2 is output from a position within positions T1 sensed using the seventeenth light source 17.

In addition, the distribution range of the light generated from the eighteenth light source 18 through the second scanning operation is overlapped with the position of the touch input TP when viewed from a top plan view. Accordingly, in the second output signal S2 output from the light sensor 60 through the second scanning operation, the second current I2, which is lower in magnitude than the first current I1 is output between the first X-axis coordinate X1 to the second X-axis coordinate X2 of a second position T2 sensed using the eighteenth light source 18.

Further, the distribution range of the light generated from the sixteenth light source 16 through the fourth scanning operation is overlapped with the position of the touch input TP when viewed from a top plan view. Accordingly, in the fourth output signal S4 output from the light sensor 60 through the fourth scanning operation, the second current I2 lower than the first current I1 is output between the first X-axis coordinate X1 and the second X-axis coordinate X2 within a fourth position T4 sensed using the sixteenth light source 16.

In contrast, the distribution range of the light generated from the nineteenth light source 19 through the third scanning operation is not overlapped with the position of the touch input TP when viewed from a top plan view. Accordingly, in the third output signal S3 output from the light sensor 60 through the third scanning operation, a position in which the signal S4 outputs a second current I2 lower than the first current I1 does not occur during the third scanning operation sensed using the nineteenth light source 19. Instead, the first current I1 is constantly output regardless of the position along the light sensor 60.

The coordinate generator 70 determines a value of a center point of a position between the first X-axis coordinate X1 and the second X-axis coordinate X2, at which the second current I2 is output during the first and second scanning operations and the fourth scanning operation, to be an X-axis coordinate X0 of the touch TP.

Figure 3:
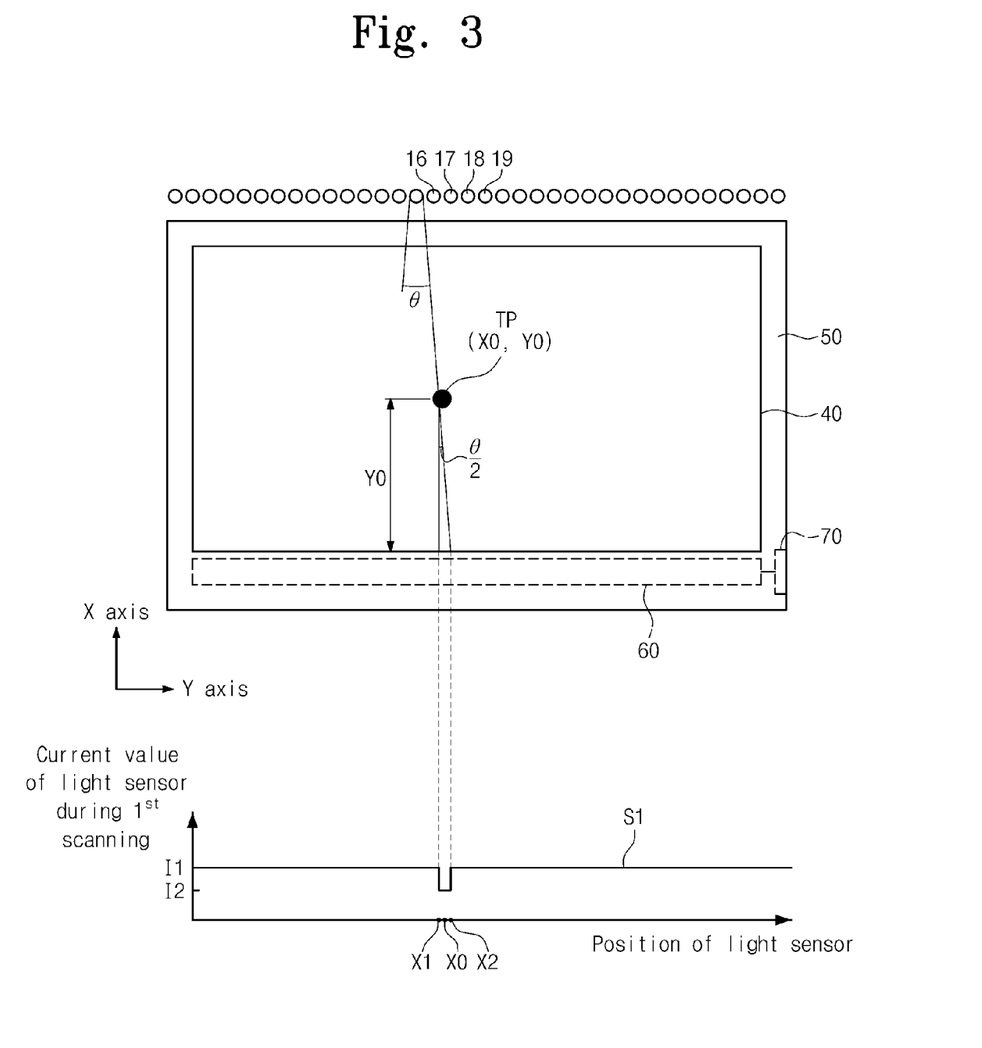
FIG. 3 is a top plan view showing an exemplary embodiment of a method of calculating a Y-axis coordinate of the touch location by the first exemplary embodiment of a touch sensing apparatus according to the present invention.

FIG. 3 is a top plan view showing a method of calculating a Y-axis coordinate of the touch input TP using the first exemplary embodiment of a touch sensing apparatus 100 according to the present invention.

Referring to FIG. 3, after the coordinate generator 70 has calculated the X-axis coordinate X0 of the touch input TP as described above with reference to FIG. 2, the coordinate generator 70 calculates a Y-axis coordinate Y0 of the touch input TP. The method of calculating the Y-axis coordinate Y0 of the touch input TP using the first exemplary embodiment of a touch sensing apparatus 100 is as follows.

When forming a right-angle triangle having a base with a length between the first X-axis coordinate X1 and the second X-axis coordinate X2 corresponding to a reduced current of the signal output from the light sensor 60 corresponding to a location on the light sensor 60, and an included angle identical to a half of an exit angle Θ, the Y-axis coordinate Y0 of the touch input TP may be calculated using Equation 1 as follows:

$$Y0=(X2-X1)/\text{TAN}(\Theta/2) \qquad \text{<Equation 1>}$$

In other words, after the X-axis coordinate (X0 of FIG. 2) of the touch input TP has been calculated as described with reference to FIG. 2, the Y-axis coordinate Y0 of the touch input TP can be obtained through Equation 1. For example, in one exemplary embodiment the Y-axis coordinate Y0 of the touch input TP may be stored in a look-up table through an algorithm of Equation 1, and thus the Y-axis coordinate Y0 of the touch input TP can be easily calculated corresponding to the first X-axis coordinate X1 and the second X-axis coordinate X2.

Figure 4:
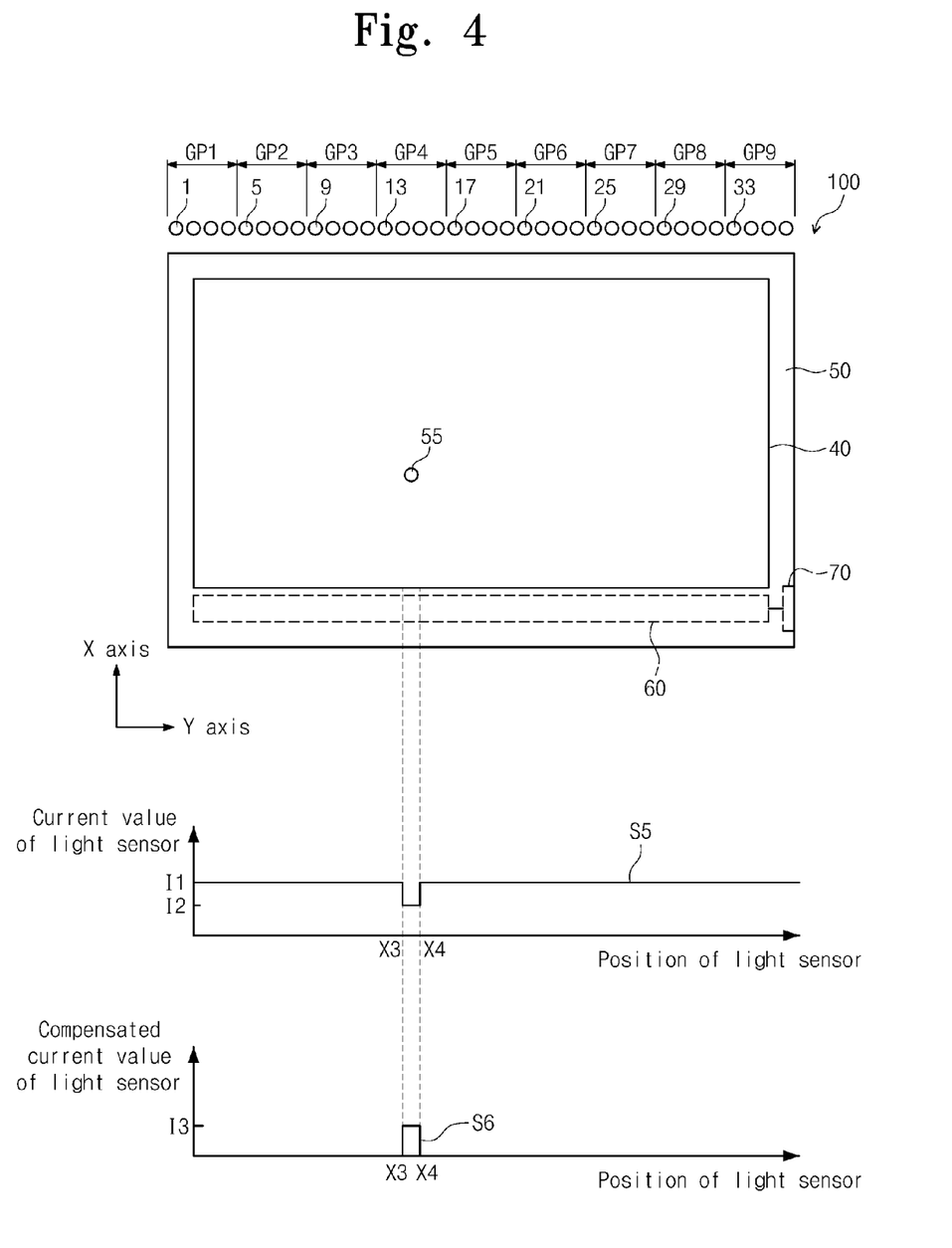
FIG. 4 is a top plan view showing an exemplary embodiment of an operation to correct a scan signal by the first exemplary embodiment of a touch sensing apparatus according to the present invention.

FIG. 4 is a top plan view showing an operation of correcting a scan signal using the first exemplary embodiment of the touch sensing apparatus 100 according to the present invention.

Referring to FIG. 4, when an object 55 causing a touch input, which is different from the touch input of the user, is placed on the surface of the light guide plate 40, the object 55 may absorb a light and prevent it from being totally transmitted through the light guide plate 40 or output the light to the outside of the light guide plate 40 similar to the touch input of the user. Accordingly, the touch sensing apparatus 100 may sense the object 55 as the touch input of the user. Therefore, in a fifth output signal S5 output from the light sensor 60, the second current I2 lower than the first current I1 may be output for a location between the third X-axis coordinate X3 and the fourth X-axis coordinate X4.

As described above, in order to prevent a sensing operation of the touch sensing apparatus 100, which is not required by the user but caused by the object 55, the fifth output signal S5 can be corrected using a sixth output signal S6 having a third current value I3 corresponding to the difference between the first current value I1 and the second current value I2 at the location between the third X-axis coordinate X3 and the fourth X-axis coordinate X4.

As described above, when correcting the fifth output signal S5 using the sixth output signal S6, even if the object 55 causes the touch input which is not initiated by the user, since the touch sensing apparatus 100 can detect the touch input of the object 55 using the corrected scan signal such as the fifth output signal S5, thereby preventing the touch sensing apparatus 100 from recognizing the touch of the object 55 as the touch of the user. Thus, the first exemplary embodiment of a touch sensing apparatus 100 may be calibrated to prevent erroneous touch input readings caused by non-user touch input, e.g., those due to manufacturing defects such as entrained dust in the light guide plate 40, etc.

Figure 5:
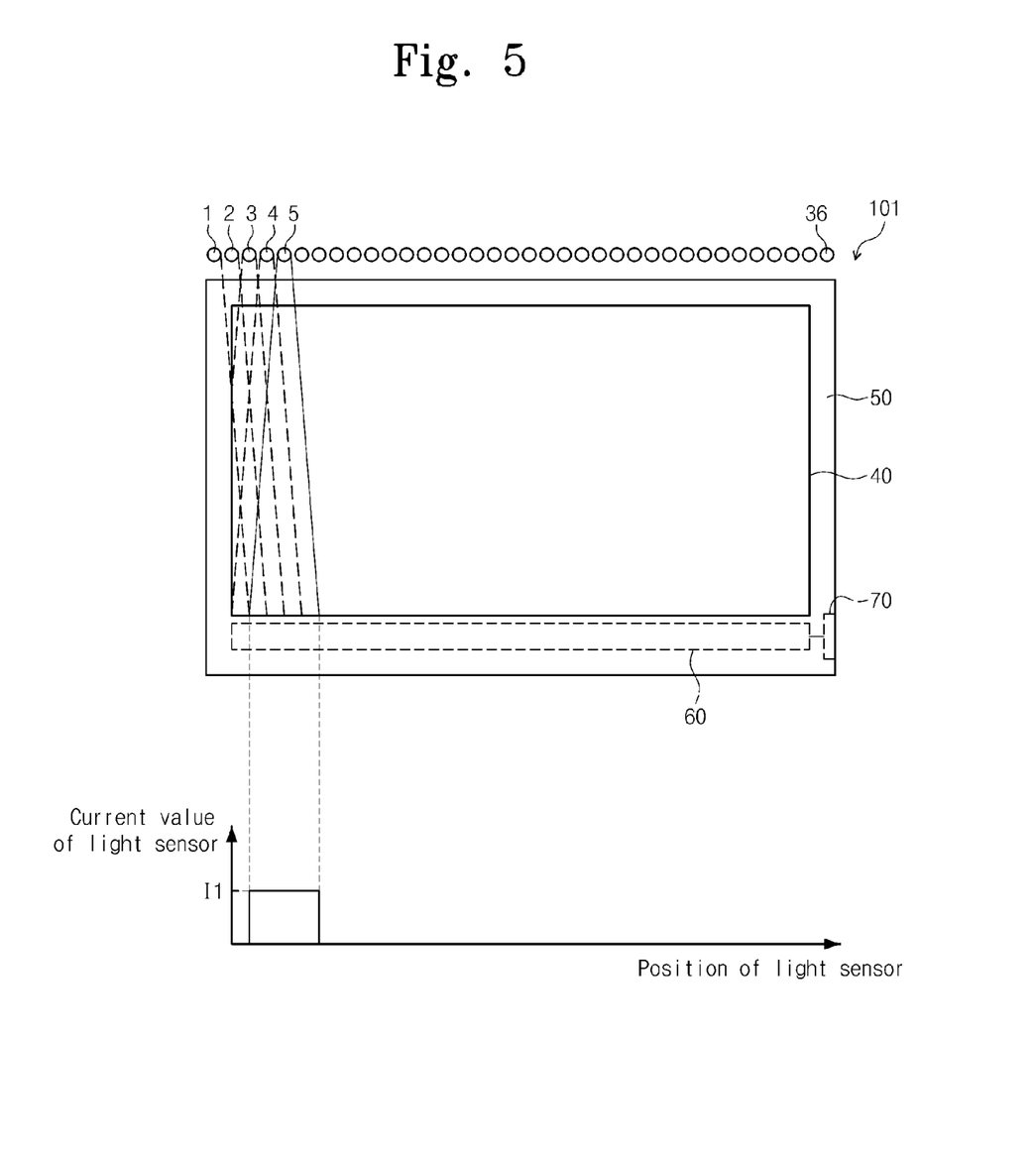
FIG. 5 is a top plan view showing an exemplary embodiments of scanning operations to detect a touch input by a second exemplary embodiment of a touch sensing apparatus according to the present invention.

FIG. 5 is a top plan view showing the scanning operation to detect a touch by a second exemplary embodiment of a touch sensing apparatus 101 according to the present invention. In FIG. 5, the same reference numerals denote the same elements as in FIG. 1, and thus detailed descriptions of the same elements will be omitted in order to avoid redundancy.

Referring to FIG. 5, while the first exemplary embodiment of a touch sensing apparatus (100 of FIGS. 1A to 1D) according to the present invention detects a touch input by performing the first to fourth scanning operations, the second exemplary embodiment of a touch sensing apparatus 101 a sequentially generates lights using the first light source 1 to the thirty-sixth light source 36 in order to detect the touch occurring on the surface of the light guide plate 40.

The light sensor 60 generates signals corresponding to a magnitude of the lights generated from the first to thirty-sixth light sources 1 to 36. In addition, the coordinate generator 70 receives the signals to detect a location of the signals at which a current is reduced corresponding to the touch input. After the location of the signals has been detected, the coordinate generator 70 calculates an X-axis coordinate and a Y-axis coordinate of the touch input as described above with reference to FIGS. 2 and 3.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of driving a touch sensing apparatus, the method comprising:
   receiving a sequentially generated series of lights;
   outputting a signal corresponding to a magnitude of each of the lights;
   receiving the signal;
   detecting whether a portion of the signal is reduced in magnitude corresponding to a touch input; and
   calculating coordinates of the touch input using the portion of the signal having reduced magnitude,
   wherein the sequentially generated series of lights are generated from at least one light source and supplied to a light guide plate, and the sequentially generated series of lights which are supplied to the light guide plate travel with a substantially identical when viewed from a top plan view, and
   wherein the calculating of the coordinates of the touch input comprises:
   calculating a Y-axis coordinate of the touch input through the following equation:

Y-axis coordinate of the touch input=length of the location/tangent(exit angel/2).

2. The method of claim 1, wherein the calculating of the coordinates of the touch input further comprises:
   detecting the location in which the signal is reduced to calculate a value of a center point of the location in an X-axis direction to be an X-axis coordinate of the touch input.

3. The method of claim 1, wherein, when the sequentially generated series of lights are supplied to the light guide plate, paths of the each series of lights, which are generated from a plurality of light sources driven at a substantially same time and travel in the light guide plate, are not overlapped with each other when viewed from a top plan view.

4. The method of claim 1, wherein the detecting of the location in which the signal is reduced comprises detecting output signals generated when a first light source to an Nth light source sequentially generate lights and detecting a location corresponding to a signal reduction of the output signals, wherein N is an integer.

5. The method of claim 4, wherein the first light source to the Nth light source comprise a plurality of light source groups, each of the plurality of light source groups comprising N light sources, and the first light source to the Nth light source of each light source group sequentially generate the series of lights.

6. The method of clam 1, wherein the at least one light source generates an infrared light.

7. The method of claim 1, further comprising compensating for the location in which the signal is reduced corresponding to the touch input.

8. A touch sensing apparatus comprising:
- at least one light source which sequentially generates a plurality of lights;
- a light sensor which faces the at least one light source and outputs a plurality of signals corresponding to a magnitude of the plurality of lights;
- a light guide plate interposed between the at least one light source and the light sensor to guide the plurality of lights from the at least one light source to the light sensor; and
- a coordinate generator which calculates coordinates of a touch input which occurs on the light guide plate using the signal output from the light sensor corresponding to the touch input,
- wherein the plurality of lights generated from the plurality of ht sources and supplied to the light guide plate travel with a substantially identical exit angle when viewed from a top plan view, and
- wherein the coordinate generator detects a location corresponding to a reduction in the signal and calculates a Y-axis coordinate of the touch input through the Mowing equation:

the $Y$-axis coordinate of the touch input=length of the location/tangent(the exit angle/2).

9. The touch sensing apparatus of claim 8, wherein the at least one light source includes a plurality of light sources sequentially arranged along one edge of the light guide plate, and the light sensor is provided along an opposite edge of the light guide plate facing the edge of the light guide plate wherein the light guide plate is interposed between the light sensor and the plurality of light sources.

10. The touch sensing apparatus of claim 9, wherein paths of the plurality of lights, which are generated from the plurality of light sources and travel in the light guide plate, are not overlapped with each other when viewed from a top plan view.

11. The touch sensing apparatus of claim 9, wherein the coordinate generator detects the location corresponding to at the reduction in the signal due to the touch input to calculate a value of a center point of the location in an X-axis direction to be an X-axis coordinate of the touch input.

12. The touch sensing apparatus of claim 8, wherein the plurality of light sources generate an infrared light.

13. The touch sensing apparatus of claim 8, wherein the light source comprises a plurality of light source groups each light source group comprising N light sources, and a first light source to an $N^{th}$ light source of each light source group sequentially generate the plurality of lights, wherein N is an integer.

* * * * *